United States Patent [19]
Purcell

[11] Patent Number: 5,625,784
[45] Date of Patent: Apr. 29, 1997

[54] VARIABLE LENGTH INSTRUCTIONS PACKED IN A FIXED LENGTH DOUBLE INSTRUCTION

[75] Inventor: Stephen C. Purcell, Mountain View, Calif.

[73] Assignee: Chromatic Research, Inc., Mountain View, Calif.

[21] Appl. No.: 281,334

[22] Filed: Jul. 27, 1994

[51] Int. Cl.$^6$ .................................................. G06F 1/00
[52] U.S. Cl. ........................................ 395/386; 395/421.04
[58] Field of Search ................................ 395/375, 421.04

[56] References Cited

U.S. PATENT DOCUMENTS

| | | | |
|---|---|---|---|
| 4,654,781 | 3/1987 | Schwartz et al. | 395/421.09 |
| 5,249,273 | 9/1993 | Yoshitake et al. | 395/375 |
| 5,423,012 | 6/1995 | Sato et al. | 395/375 |
| 5,448,746 | 9/1995 | Eickemeyer et al. | 395/800 |
| 5,560,036 | 9/1996 | Yoshida | 395/800 |

OTHER PUBLICATIONS

John Hennessy & David Patterson, *Computer Architecture a Quantitative Approach*, 1990, pp. 150–166.

XL–8220 Processor Data Book, Weitek Corp., Sunnyvale, CA, Mar., 1990, 5 pages.

*Primary Examiner*—Jack B. Harvey
*Assistant Examiner*—Jeffrey K. Seto
*Attorney, Agent, or Firm*—Skjerven, Morrill, MacPherson, Franklin & Friel; Alan H. MacPherson; E. Eric Hoffman

[57] ABSTRACT

A structure and method for using variable length instructions in an instruction register having a fixed word boundary. The instruction register accommodates a first word and a second word. The first word has a first base instruction and a first flexible instruction aligned with first and second predetermined positions, respectively, in the instruction register. The second word has a second base instruction and a second flexible instruction aligned with third and fourth predetermined positions, respectively, in the instruction register. The first and second base instructions and the first and second flexible instructions each have a fixed length. The first base instruction can (1) stand alone as an independent instruction, (2) be combined with the first flexible instruction to form a once-extended instruction, or (3) be combined with the first and second flexible instructions to form a twice-extended instruction. The second base instruction can (1) stand alone as an independent instruction, (2) be combined with the second flexible instruction to form a once-extended instruction, or (3) be combined with the first and second flexible instructions to form a twice-extended instruction. If the first and/or second flexible instructions are not combined with the first or second base instructions, they are used as flexible independent instructions.

18 Claims, 5 Drawing Sheets

| [71:68] | | [35:32] | |
|---|---|---|---|
| | 0000-0110 | 0111-1110 | 1111 |
| 0000-0110 | CONFIG.1 | CONFIG.5 | CONFIG.3 |
| 0111-1110 | CONFIG.6 | CONFIG.2 | X |
| 1111 | CONFIG.4 | X | X |

FIG.7

VARIABLE LENGTH INSTRUCTIONS PACKED IN A FIXED LENGTH DOUBLE INSTRUCTION

BACKGROUND OF THE INVENTION

1. Field of the Invention

The present invention relates to a structure and method for using variable length instructions in a data processing system.

2. Description of the Prior Art

Data processing systems typically utilize instruction registers which have a fixed word boundary. This word boundary defines a fixed number of instruction bytes that can be provided to the processing system at any given time.

Figure 1:
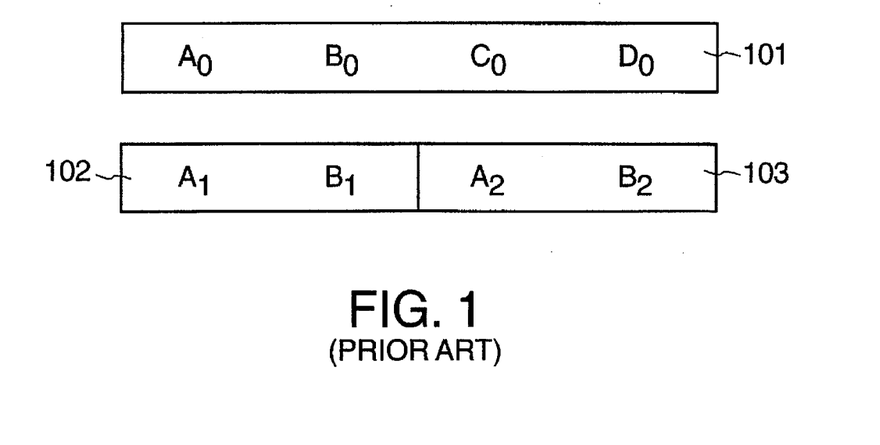
FIG. 1 is a schematic diagram illustrating instructions used in a conventional data processing system.

FIG. 1 is a schematic diagram illustrating instructions 101–103 used in a conventional data processing system (such as the Hewlett Packard HP3000 processor) having an instruction register with a fixed word boundary of four bytes. Instruction 101 is a 4-byte instruction which includes bytes $A_0$, $B_0$, $C_0$ and $D_0$. Instructions 102 and 103 are 2-byte instructions which include bytes $A_1$, $B_1$, $A_2$ and $B_2$. The HP3000 is designed to decode either 4-byte instruction 101 or 2-byte instructions 102 and 103. Such a data processing system is restricted to two instruction lengths.

Figure 2:
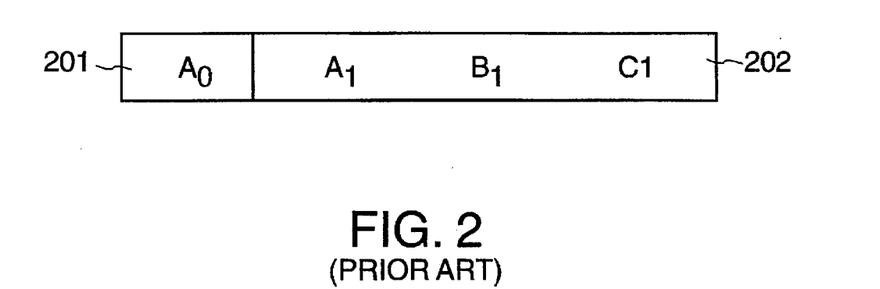
FIG. 2 is a schematic diagram illustrating instructions used in another conventional data processing system.

FIG. 2 is a schematic diagram illustrating instructions 201–202 used in another conventional data processing system which has an instruction register with a fixed word boundary of four bytes. Such an instruction register is utilized in the XL 2067 and XL 8220 processors made by Weitek Inc. Instruction 201 is a 1-byte instruction which includes byte $A_0$ and instruction 202 is a 3-byte instruction which include bytes $A_1$, $B_1$ and $C_1$. The XL 2067 and XL 8220 processors are designed to decode 1-byte instruction 201 followed by 3-byte instruction 202. Again, this processor is restricted to two instruction lengths.

Figure 3:
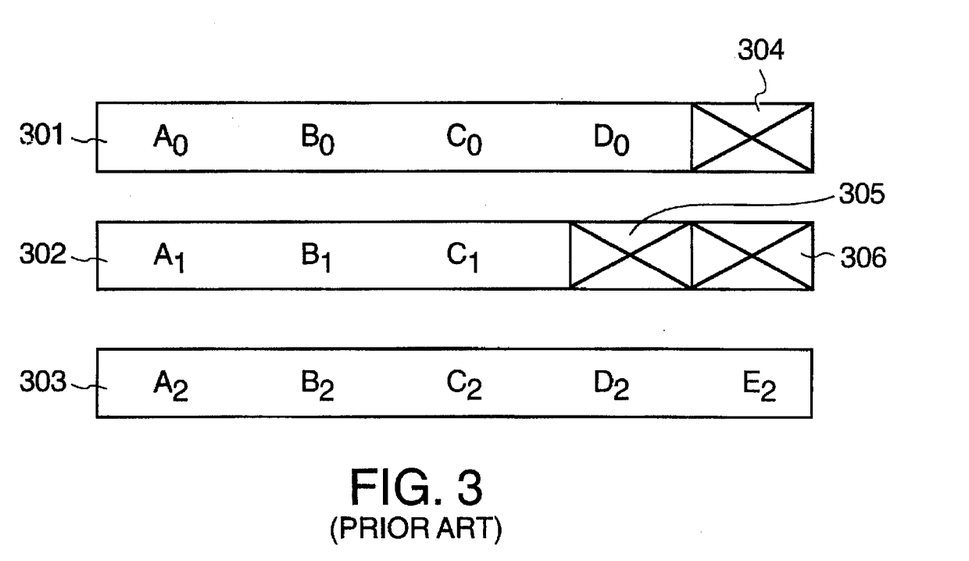
FIG. 3 is a schematic diagram illustrating instructions used in another conventional data processing system.

FIG. 3 is a schematic diagram illustrating instructions used in a conventional data processing system which has an instruction register with a fixed word boundary of five bytes. Four-byte instruction 301, 3-byte instruction 302 and 5-byte instruction 303 are each allocated five bytes within the instruction register. Byte 304 attached to 4-byte instruction 301 and bytes 305–306 attached to 3-byte instruction 302 are not utilized. While such a processor utilizes more than two instruction lengths, it does not efficiently use all the bytes in the full allocated word boundary of the associated instruction register.

Figure 4:
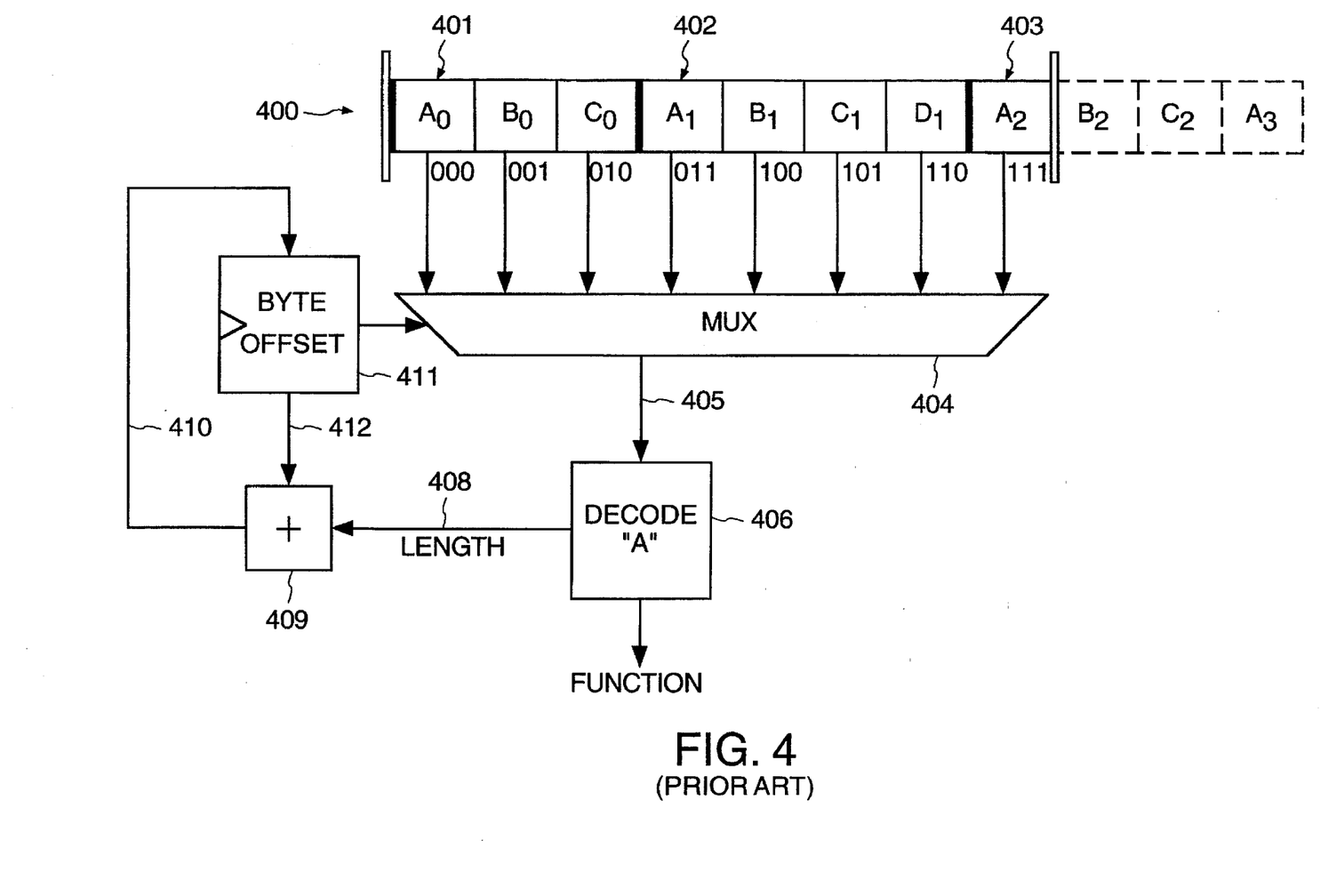
FIG. 4 is a schematic diagram illustrating instructions and decoding circuitry used in another conventional data processing system.

In yet other data processing systems, variable length instructions which span the fixed word boundary of the instruction register are used. FIG. 4 is a schematic diagram illustrating instructions used in another conventional data processing system which has an instruction register 400 with a fixed word boundary of eight bytes. All three bytes ($A_0$, $B_0$, $C_0$) of 3-byte instruction 401, all four bytes ($A_1$, $B_1$, $C_1$, $D_1$) of 4-byte instruction 402 and the first byte ($A_2$) of 3-byte instruction 403 are initially read into instruction register 400. The eight bytes in instruction register 400 are provided to multiplexer circuit 404. Multiplexer circuit 404 routes one of the eight bytes in instruction register to decoder circuit 406 in response to a signal provided by byte offset register 411. The signal provided by byte offset register 411 is representative of the location of the first byte of the next instruction to be decoded. Table 1 helps to illustrate the operation of the circuitry in FIG. 4.

TABLE 1

| Byte Offset Register | Decoded Byte | Instruction Length | New Byte Offset Register |
|---|---|---|---|
| 000 | $A_0$ | 011 | 011 |
| 011 | $A_1$ | 100 | 111 |
| 111 | $A_2$ | 011 | 010 |
| 010 | $A_3$ | ... | ... |

Initially, 3-bit byte offset register 411 is set to zero (i.e., 000). The contents of byte offset register 411 are transmitted to multiplexer circuit 404. In response, multiplexer circuit 404 routes byte $A_0$ (from byte location 000 of instruction register 400) to decoder circuit 406 on lead 405. The length of instruction 401 is encoded in byte $A_0$. Decoder circuit 406 decodes the length of instruction 401 (i.e., 3 bytes). The decoded length of instruction 401 is provided to adder circuit 409 on lead 408. Adder circuit 409 adds the length of instruction 401 (011) and the contents of byte offset register 411 (000) to create a summed output signal (011). This summed output signal is transmitted to byte offset register 411 on lead 410.

The contents of byte offset register 411 are again transmitted to multiplexer circuit 404. In response, multiplexer circuit 404 routes byte $A_1$ (from byte location 011 of instruction register 400) to decoder circuit 406. Decoder circuit 406 decodes the length of instruction 402 (i.e., 4 bytes). Adder circuit 409 adds the length of instruction 402 (100) and the contents of byte offset register 411 (011) to create a new summed output signal (111). The new summed output signal is stored in byte offset register 411.

The contents of byte offset register 411 are again transmitted to multiplexer circuit 404. In response, multiplexer circuit 404 routes byte $A_2$ (from byte location 111 of instruction register 400) to decoder circuit 406. Decoder circuit 406 decodes the length of instruction 403 (i.e., 3 bytes). Adder circuit 409 adds the length of instruction 403 (011) and the contents of byte offset register 411 (111), ignoring the carry bit, to create a new summed output signal (010). The new summed output signal is stored in byte offset register 411.

The next eight instruction bytes, which include the remaining two bytes $B_2$, $C_2$ of 3-byte instruction 403, are read into instruction register 400. The contents of byte offset register 411 are again transmitted to multiplexer circuit 404. In response, multiplexer circuit 404 routes byte $A_3$ (from byte location 010 of instruction register 400) to decoder circuit 406. Decoding then continues as previously described.

While the data processing system described in connection with FIG. 4 utilizes the entire allocated fixed word boundary of instruction register 400 and allows more than two instruction lengths to be used, the additional circuitry required to locate the first byte of each instruction increases the layout area and reduces the speed of the data processing system.

It would therefore be desirable to have a data processing system which utilizes the entire allocated fixed word boundary and allows more than two instruction lengths to be used, without requiring extensive and space consuming decoding circuitry.

SUMMARY OF THE INVENTION

Accordingly, the present invention provides a data processing system which utilizes an instruction register having a fixed word boundary. The instruction register accommodates a first word and a second word. The first word has a first base instruction aligned with a first predetermined position in the instruction register and a first flexible instruction aligned with a second predetermined position in the instruction register. Similarly, the second word has a second base instruction aligned with a third predetermined position in the instruction register and a second flexible instruction aligned with a fourth predetermined position in the instruction register. The first and second base instructions and the first and second flexible instructions each have a fixed length, although not necessarily the same length.

The first base instruction contains information which indicates whether the first base instruction (1) stands alone as an independent instruction, (2) is combined with the first flexible instruction to form a longer instruction which is referred to as a once-extended instruction, or (3) is combined with the first and second flexible instructions to form an even longer instruction which is referred to as a twice-extended instruction.

Similarly, the second base instruction contains information which indicates whether the second base instruction (1) stands alone as an independent instruction, (2) is combined with the second flexible instruction to form a once-extended instruction, or (3) is combined with the first and second flexible instructions to form a twice-extended instruction.

In one embodiment, when first base instruction stands alone as an independent instruction, and the second base instruction-does not form a twice-extended instruction, the first flexible instruction stands alone as a flexible independent instruction. Similarly, when the second base instruction stands alone as an independent instruction, and the first base instruction does not form a twice-extended instruction, the second flexible instruction stands alone as a flexible independent instruction.

In an alternate embodiment, the fixed word boundary of the instruction register is eight bytes wide, the first and second base instructions are each three bytes wide and the first and second flexible instructions are each one byte wide. In such an embodiment, the flexible independent instructions are one byte wide, the independent instructions are three bytes wide, the once-extended instructions are four bytes wide and the twice-extended instructions are five bytes wide.

In the foregoing manner, instructions having a plurality of lengths can be packed within the fixed word boundary of the instruction register. Because the first and second base instructions are aligned with predetermined locations, the need for complex decoding circuitry is eliminated.

The present invention will be more fully understood in view of the following drawings taken together with the detailed description.

DETAILED DESCRIPTION OF THE INVENTION

Figure 5:
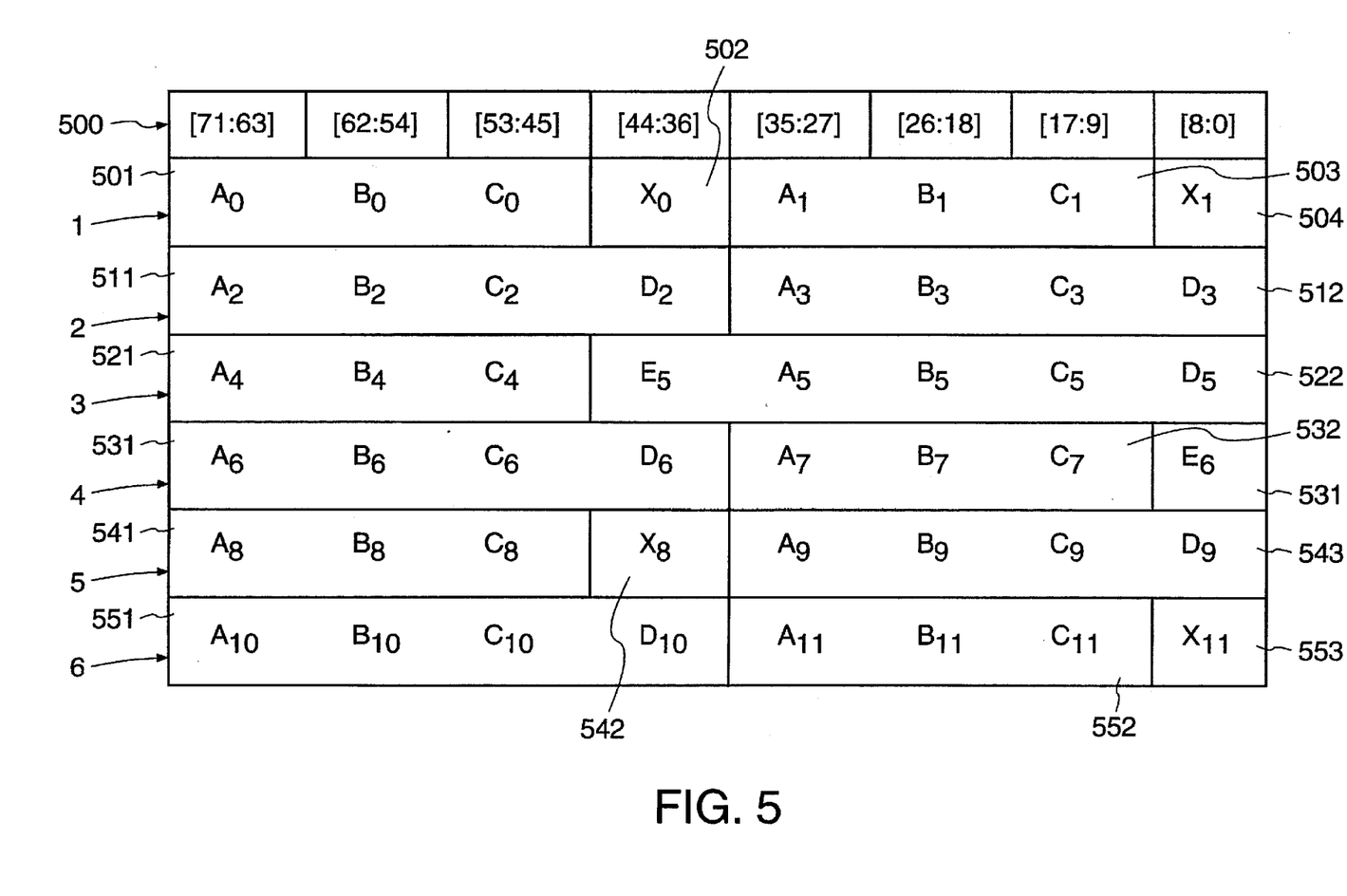
FIG. 5 is a schematic diagram illustrating variable length instructions in accordance with one embodiment of the present invention.

FIG. 5 is a block diagram illustrating instruction register 500 and variable length instructions 501–553 in accordance with one embodiment of the present invention. Instruction register 500 is a 72-bit double word register which receives two 4-byte words, INST[71:36] and INST[35:0]. Each 4-byte word includes four 9-bit bytes. Thus, 4-byte word INST[71:36] includes 9-bit instruction bytes INST[71:63], INST[62:54], INST[53:45] and INST[44:36]. Similarly, 4-byte word INST[35:0] includes 9-bit instruction bytes INST[35:27], INST[26:18], INST[17:9] and INST[8:0].

In one embodiment of the present invention, instruction register 500 receives 1-byte instructions 502, 504, 542 and 553, 3-byte instructions 501, 503, 521, 532, 541 and 552, 4-byte instructions 511, 512, 543 and 551 and 5-byte instructions 522 and 531. The three bytes in bit positions [71:63], [62:54] and [53:45] make up a first base instruction. The byte in bit positions [44:36] includes a first flexible instruction. The bytes in bit positions [35:27], [26:18] and [17:9] include a second base instruction. The byte in bit positions [8:0] include a second flexible instruction. These instructions are utilized as described below.

FIG. 5 illustrates six possible configurations 1–6 of the 1, 3, 4 and 5-byte instructions. Configuration 1 includes 3-byte instructions 501 and 503 and 1-byte instructions 502 and 504. Three-byte instruction 501 includes instruction bytes $A_0$, $B_0$ and $C_0$ which are located within bit positions [71:63], [62:54] and [53:45] of instruction register 500, respectively. One-byte instruction 502 includes an instruction byte $X_0$ which is located within bit positions [44:36] of instruction register 500. Instruction byte $A_0$ includes encoded information which indicates that instruction 501 is an independent three-byte instruction having bytes positioned as previously described.

Similarly, three-byte instruction 503 includes instruction bytes $A_1$, $B_1$ and $C_1$ which are located within bit positions [35:27], [26:18] and [17:9] of instruction register 500, respectively. One-byte instruction 504 includes an instruction byte $X_1$ which is located within bit positions [8:0] of instruction register 500. Instruction byte $A_1$ includes encoded information which indicates that instruction 503 is an independent three-byte instruction having bytes positioned as previously described.

Configuration 2 includes 4-byte instructions 511 and 512. Four-byte instruction 511 includes instruction bytes $A_2$, $B_2$, $C_2$ and $D_2$ which are located within bit positions [71:63], [62:54], [53:45] and [44:36] of instruction register 500, respectively. Instruction byte $A_2$ includes encoded information which indicates that instruction 511 is a 4-byte instruction having bytes positioned as previously described. Because the alignment of bytes $A_0$, $B_0$ and $C_0$ of instruction 501 is identical to the alignment of bytes $A_2$, $B_2$ and $C_2$ of instruction 511, instruction 511 may be viewed as a 3-byte instruction which has been once-extended by byte $D_2$ to become a 4-byte instruction.

Similarly, 4-byte instruction 512 includes instruction bytes $A_3$, $B_3$, $C_3$ and $D_3$ which are located in bit positions [35:27], [26:18], [17:9] and [8:0] of instruction register 500, respectively. Instruction byte $A_3$ includes encoded information which indicates that instruction 512 is a 4-byte instruction having bytes positioned as previously described. Like instruction 511, instruction 512 is a once-extended instruction.

Configuration 3 includes 3-byte instruction 521 and 5-byte instruction 522. Three-byte instruction 521 includes instruction bytes $A_4$, $B_4$ and $C_4$ which are located within bit positions [71:63], [62:54] and [53:45] of instruction register 500, respectively. Instruction byte $A_4$ includes encoded information which indicates that instruction 521 is a 3-byte instruction having bytes positioned as previously described.

Five-byte instruction 522 includes instruction bytes $A_5$, $B_5$, $C_5$, $D_5$, and $E_5$ which are located within bit positions [35:27], [26:18], [17:9], [8:0] and [44:36], respectively. Instruction byte $A_5$ includes encoded information which indicates that instruction 522 is a 5-byte instruction having bytes positioned as previously described. Because the alignment of bytes $A_1$, $B_1$ and $C_1$ of 3-byte instruction 503 is identical to the alignment of bytes $A_5$, $B_5$ and $C_5$ of instruction 522, instruction 522 may be viewed as a 3-byte instruction which has been twice-extended by bytes $D_5$ and $E_5$ to form a 5-byte instruction.

Configuration 4 includes 5-byte instruction 531 and 3-byte instruction 532. Five-byte instruction 531 includes instruction bytes $A_6$, $B_6$, $C_6$, $D_6$, and $E_6$ which are located within bit positions [71:63], [62:54], [53:45], [44:36] and [8:0], respectively. Instruction byte $A_6$ includes encoded information which indicates that instruction 531 is a 5-byte instruction having bytes positioned as previously described. Because the alignment of bytes $A_0$, $B_0$ and $C_0$ of 3-byte instruction 501 is identical to the alignment of bytes $A_6$, $B_6$ and $C_6$ of instruction 531, instruction 531 may be viewed as a 3-byte instruction which has been twice-extended by bytes $D_6$ and $E_6$ to form a 5-byte instruction.

Three-byte instruction 532 includes instruction bytes $A_7$, $B_7$ and $C_7$ which are aligned with bit positions [35:27], [26:18] and [17:9], respectively. Instruction byte $A_7$ indicates that instruction 532 is a 3-byte instruction having bytes positioned as previously described.

Configuration 5 includes 3-byte instruction 541, 1-byte instruction 542 and 4-byte instruction 543, which are similar to instructions 501, 502 and 512, respectively, as previously described.

Configuration 6 includes 4-byte instruction 551, 3-byte instruction 552 and 1-byte instruction 553, which are similar to instructions 511, 503 and 504, respectively, as previously described.

In certain cases, two consecutive instructions may require a total length which exceeds the eight byte fixed word boundary (i.e., two consecutive 5-byte instructions or a 5-byte instruction and a 4-byte instruction). In such cases, the first of the two consecutive instructions is loaded into the instruction register, with the first byte of the instruction aligned with bit positions [71:63] as previously described. The unused bytes of the instruction register are filled with no operation (NOP) instructions. The second of the two consecutive instructions is then loaded into the instruction register with the next group of eight bytes.

Figure 6:
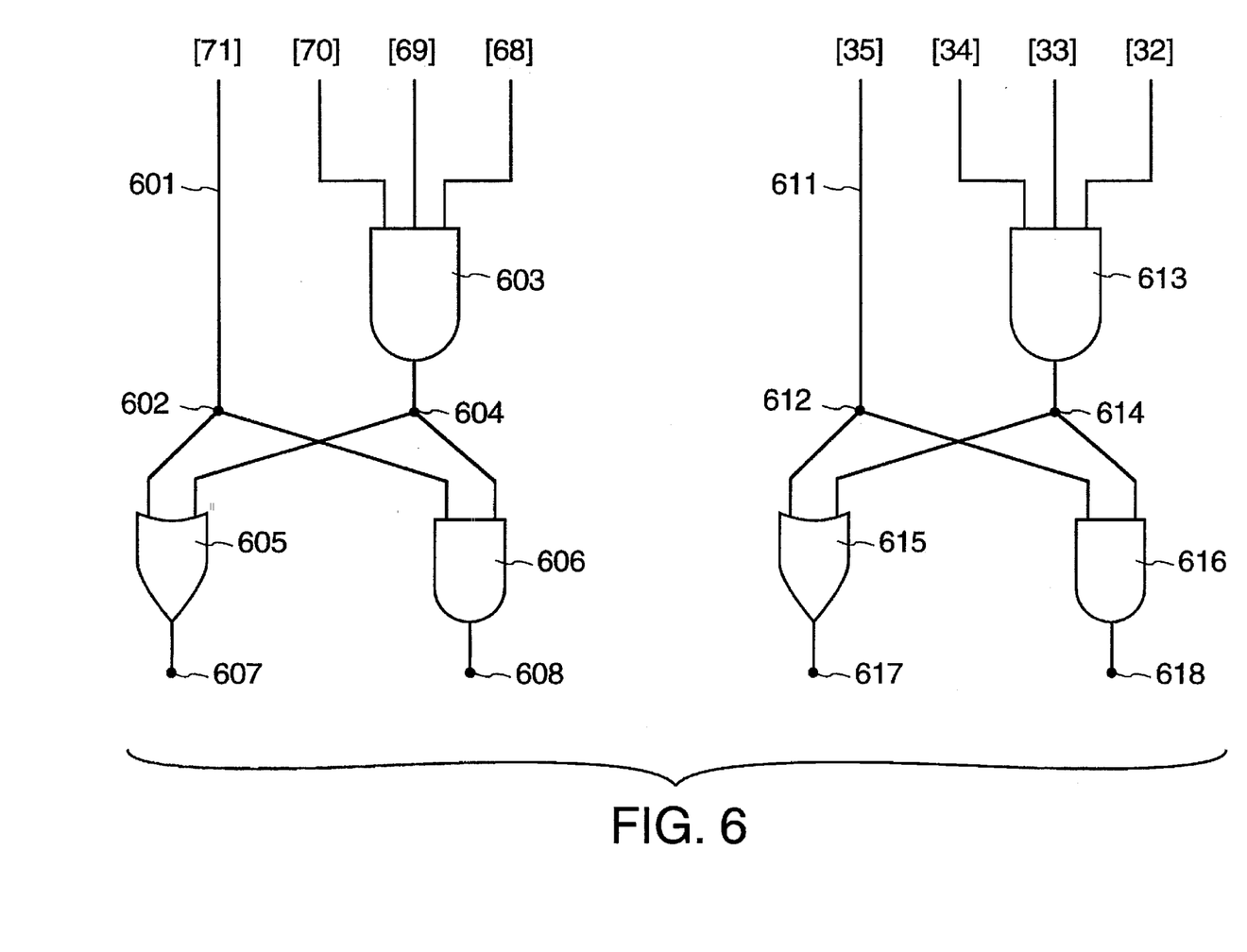
FIG. 6 is a schematic diagram of circuitry used to decode the length and location of instructions in accordance with one embodiment of the present invention.

FIG. 6 is a schematic diagram of circuitry used to decode the length and location of instructions in accordance with one embodiment of the present invention. In this embodiment, bits [71:68] are used to decode the first instruction and bits [35:32] are used to decode the second instruction. Bit [71] is transmitted on lead 601 to terminal 602. Bits [70:68] are provided to input terminals of AND gate 603.

The output signal from AND gate 603 is provided to terminal 604. Terminals 602 and 604 are coupled to input terminals of OR gate 605 and AND gate 606. The output signals from OR gate 605 and AND gate 606 are provided to terminals 607 and 608, respectively. A logic high signal at terminal 607 causes the 3-byte base instruction stored in bit positions [71:63], [62:54] and [53:45] to be extended by the byte stored in bit positions [44:36]. A logic high signal at terminal 608 causes the 3-byte base instruction stored in bit positions [71:63], [62:54] and [53:45] to be extended by the bytes stored in bit positions [44:36] and [8:0].

When the value of bits [71:68] is 0–6 (i.e., 0000 to 0110), logic low values are transmitted to terminals 602 and 604. As a result, logic low values are also provided to terminals 607 and 608. These logic low values are provided to conventional circuitry which causes the 3-byte base instruction stored in bit positions [71:63], [62:54] and [53:45] to be interpreted as a separate 3-byte instruction.

When the value of bits [71:68] is 7–14 (i.e., 0111 to 1110), a logic low value is transmitted to one of terminals 602 and 604 and a logic high value is transmitted to the other one of terminals 602 and 604. As a result, a logic high value is provided to terminal 607 and a logic low value is provided to terminal 608. These values are provided to conventional circuitry which causes the 3-byte instruction stored in bit positions [71:63], [62:54] and [53:45] to be extended using the byte stored in bit positions [44:36], thereby forming a 4-byte instruction.

When the value of bits [71:68] is 15 (i.e., 1111), logic high values are transmitted to terminals 602 and 604. As a result, logic high values are provided to terminals 607 and 608. These logic high values are provided to conventional circuitry which causes the 3-byte instruction stored in bit positions [71:63], [62:54] [53:45] to be extended with the bytes stored in bit positions [44:36] and [8:0], thereby forming a 5-byte instruction.

In a similar manner, bits [35:32] are used to decode the second instruction. Bit [35] is transmitted on lead 611 to terminal 612. Bits [34:32] are provided to input terminals of AND gate 613. The output signal from AND gate 613 is provided to terminal 614. Terminals 612 and 614 are coupled to input terminals of OR gate 615 and AND gate 616. The output signals from OR gate 615 and AND gate 616 are provided to terminals 617 and 618, respectively.

In an alternate embodiment, conventional read-only memory (ROM) look-up tables are used to decode the information stored in bits [71:68] and [35:32].

Figure 7:
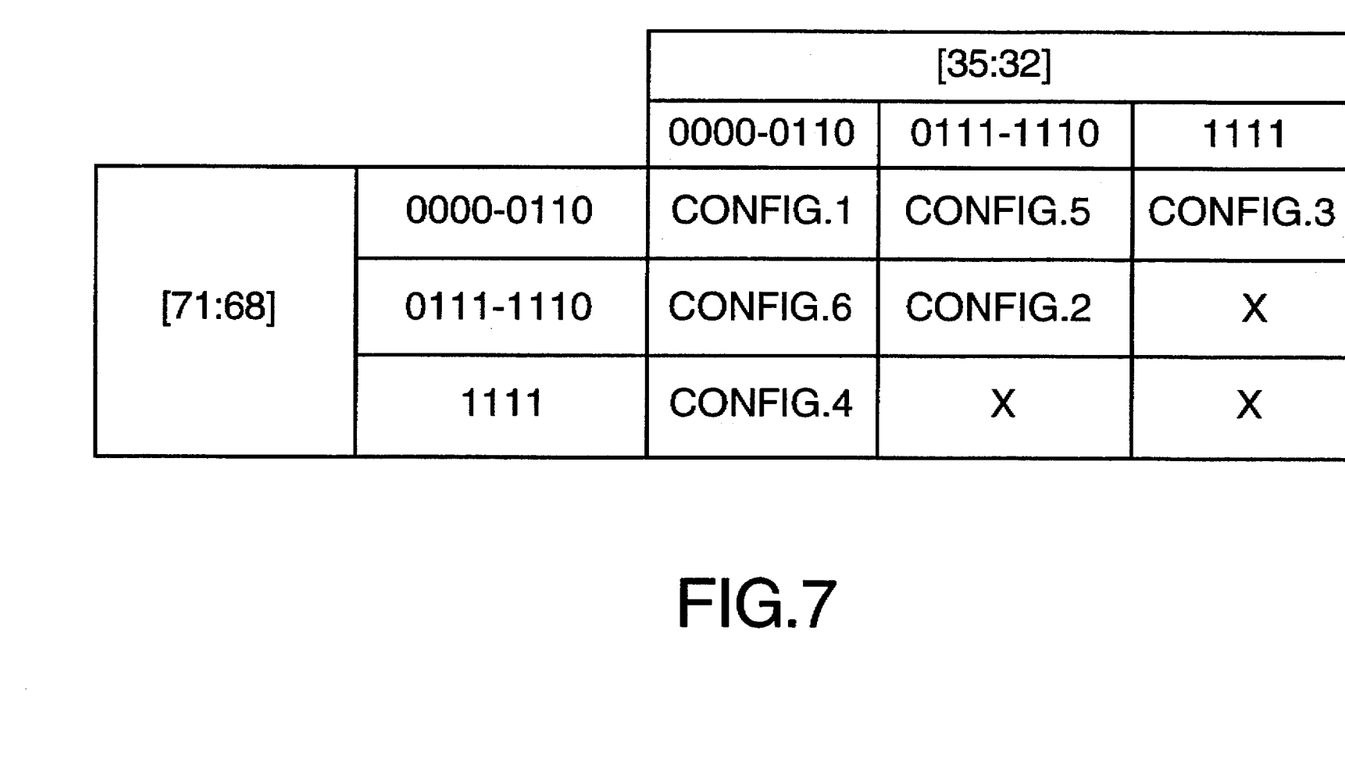
FIG. 7 is a table which illustrates how instruction bits are decoded in accordance with one embodiment of the present invention.

FIG. 7 is a table which illustrates how bits [71:68] and [35:32] are decoded to determine which of configurations 1–6 (FIG. 5) is being utilized. For example, when the value of bits [35:32] is 8 (i.e., 1000) and the value of bits [71:68] is three (i.e., 0011), the corresponding 8-byte instruction takes the form of configuration 5. That is, a 3-byte instruction in bit positions [71:63], [62:54] and [53:45], a 1-byte instruction in bit positions [44:36] and a 4-byte instruction in bit positions [35:27], [26:18], [17:9] and [8:0]. The X's in FIG. 7 indicate an illegal 8-byte instruction configuration.

The present invention allows a plurality of instruction lengths to be utilized while efficiently using the fixed word boundary of instruction register 500. By allowing instructions having up to four different lengths to be flexibly packed into two double words, the present invention reduces the average memory storage required per instruction. Moreover, because the information required to decode the instructions in each of the six configurations is located in predetermined locations (i.e., bit positions [71:63] and [35:27] of instruction register 500), complicated decoding circuitry is not required.

While the present invention has been described in connection with a particular embodiment, it is understood that invention is not limited to the embodiment disclosed, but is capable of various modifications which would be apparent to one of ordinary skill in the art. For example, the present invention is applicable to data processing systems which utilize instruction registers having fixed word boundaries with lengths other than eight bytes and 72-bits. Moreover, the present invention can be applied to instructions having lengths other than (or in addition to) 1, 3, 4 and 5 bytes. Thus, the present invention is limited only by the following claims.

I claim:

1. A data processing system comprising an instruction register having a fixed word boundary which accommodates a first word and a second word, wherein said first word comprises
   a first fixed length base instruction aligned with a first predetermined position in said instruction register, and
   a first fixed length flexible instruction aligned with a second predetermined position in said instruction register,
and said second word comprises
   a second fixed length base instruction aligned with a third predetermined position in said instruction register, and
   a second fixed length flexible instruction aligned with a fourth predetermined position in said instruction register,
wherein said first base instruction contains information which indicates whether said first base instruction stands alone as an independent instruction, said first base instruction is combined with said first flexible instruction to form a once-extended instruction, or said first base instruction is combined with said first and second flexible instructions to form a twice-extended instruction.

2. The data processing system of claim 1, wherein said second base instruction includes information which indicates whether said second base instruction stands alone as an independent instruction, said second base instruction is combined with said second flexible instruction to form a once-extended instruction, or said second base instruction is combined with said first and second flexible instructions to form a twice-extended instruction.

3. The data processing system of claim 2, wherein if said first base instruction stands alone as an independent instruction, then said second base instruction stands alone as an independent instruction, is combined with said second flexible instruction to form a once-extended instruction, or is combined with said first and second flexible instructions to form a twice-extended instruction.

4. The data processing system of claim 2, wherein if said first base instruction is combined with said first flexible instruction to form a once-extended instruction, then said second base instruction stands alone as an independent instruction or is combined with said second flexible instruction to form a once-extended instruction.

5. The data processing system of claim 2, wherein if said first base instruction is combined with said first and second flexible instructions to form a twice-extended instruction, then said second base instruction stands alone as an independent instruction.

6. The data processing system of claim 2, wherein if said first base instruction stands alone as an independent instruction and said second instruction is not a twice-extended instruction, then said first flexible instruction is a flexible independent instruction.

7. The data processing system of claim 6, wherein the fixed word boundary of said instruction register is eight bytes wide, said flexible independent instructions are one byte wide, said first independent instructions are three bytes wide, said once-extended instructions are four bytes wide and said twice-extended instructions are five bytes wide.

8. The data processing system of claim 2, wherein if said second base instruction stands alone as an independent instruction and said first instruction is not a twice-extended instruction, then said second flexible instruction is a flexible independent instruction.

9. The data processing system of claim 8, wherein the fixed word boundary of said instruction register is eight bytes wide, said flexible independent instructions are one byte wide, said first independent instructions are three bytes wide, said once-extended instructions are four bytes wide and said twice-extended instructions are five bytes wide.

10. The data processing system of claim 1, wherein the fixed word boundary of said instruction register is eight bytes wide, said first and second base instructions are each three bytes wide and said first and second flexible instructions are each one byte wide.

11. The data processing system of claim 10, wherein instructions having lengths of one, three, four or five bytes are selectively formed from said first and second base instructions and said first and second flexible instructions.

12. The data processing system of claim 10, wherein each byte has nine bits.

13. A method of packing variable length instructions into a fixed length double word having a first word and a second word, said method comprising the steps of:
   aligning a first fixed length base instruction with a first predetermined position in said first word;
   aligning a first fixed length flexible instruction with a second predetermined position in said first word;
   aligning a second fixed length base instruction with a third predetermined position in said second word;
   aligning a second fixed length flexible instruction with a fourth predetermined position in said second word; and
   providing information in said first base instruction which indicates whether said first base instruction stands alone as an independent instruction, is combined with said first flexible instruction to form a once-extended instruction, or is combined with said first and second flexible instructions to form a twice-extended instruction.

14. The method of claim 13, further comprising the step of providing information in said second base instruction which indicates whether said second base instruction stands alone as an independent instruction, is combined with said second flexible instruction to form a once-extended instruction, or is combined with said first and second flexible instructions to form a twice-extended instruction.

15. The method of claim 14, further comprising the step of using said first flexible instruction as a flexible independent instruction when said first base instruction stands alone as an independent instruction and said second instruction is not a twice-extended instruction.

16. The method of claim 15, wherein said fixed length double word includes eight bytes, said first and second base instructions each include three bytes and said first and second flexible instructions each include one byte, whereby each flexible independent instruction has one byte, each independent instruction has three bytes, each once-extended instruction has four bytes, and each twice-extended instruction has five bytes.

17. The method of claim 14, further comprising the step of using said second flexible instruction as a flexible independent instruction when said second base instruction stands alone as an independent instruction and said first instruction is not a twice-extended instruction.

18. The method of claim 17, wherein said fixed length double word includes eight bytes, said first and second base instructions each include three bytes and said first and second flexible instructions each include one byte, whereby each flexible independent instruction has one byte, each independent instruction has three bytes, each once-extended instruction has four bytes, and each twice-extended instruction has five bytes.

* * * * *